ns011122293B2

(12) United States Patent
Li et al.

(10) Patent No.: US 11,122,293 B2
(45) Date of Patent: Sep. 14, 2021

(54) INTRA-FRAME PREDICTION-BASED POINT CLOUD ATTRIBUTE COMPRESSION METHOD

(71) Applicant: PEKING UNIVERSITY SHENZHEN GRADUATE SCHOOL, Guangdong (CN)

(72) Inventors: Ge Li, Guangdong (CN); Yiting Shao, Guangdong (CN)

(73) Assignee: Peking University Shenzhen Graduate School, Guangdong (CN)

(*) Notice: Subject to any disclaimer, the term of this patent is extended or adjusted under 35 U.S.C. 154(b) by 0 days.

(21) Appl. No.: 16/955,615

(22) PCT Filed: Feb. 12, 2018

(86) PCT No.: PCT/CN2018/076435
§ 371 (c)(1),
(2) Date: Jun. 18, 2020

(87) PCT Pub. No.: WO2019/153326
PCT Pub. Date: Aug. 15, 2019

(65) Prior Publication Data
US 2020/0366932 A1 Nov. 19, 2020

(30) Foreign Application Priority Data

Feb. 11, 2018 (CN) .......................... 201810141697.2

(51) Int. Cl.
*H04N 19/593* (2014.01)
*H04N 19/136* (2014.01)
(Continued)

(52) U.S. Cl.
CPC ......... *H04N 19/593* (2014.11); *H04N 19/136* (2014.11); *H04N 19/156* (2014.11);
(Continued)

(58) Field of Classification Search
CPC .. H04N 19/593; H04N 19/136; H04N 19/156; H04N 19/159; H04N 19/176;
(Continued)

(56) References Cited

U.S. PATENT DOCUMENTS

| 10,552,989 B2 | 2/2020 | Li et al. |
| 2013/0034153 A1* | 2/2013 | Song .................. H04N 19/159 |
| | | 375/240.03 |

(Continued)

FOREIGN PATENT DOCUMENTS

| CN | 105844691 | 8/2016 |
| CN | 106934853 | 7/2017 |

(Continued)

OTHER PUBLICATIONS

English translation of International Search Report from corresponding PCT Appln. No. PCT/CN2018/076435, dated Nov. 9, 2018.

*Primary Examiner* — Nasim N Nirjhar
(74) *Attorney, Agent, or Firm* — Grossman Tucker Perrault & Pfleger, PPLC

(57) ABSTRACT

An intra-frame prediction-based point cloud attribute compression method. A new block structure-based intra-frame prediction scheme is provided for point cloud attribute information, where four prediction modes are provided to reduce information redundancy among different coding blocks as much as possible and improve point cloud attribute compression performance. The method comprises: performing point cloud attribute color space conversion; dividing a point cloud by using a K-dimensional (KD) tree to obtain coding blocks; performing block structure-based intra-frame prediction; performing intra-frame prediction mode division; performing conversion, uniform quantization, and entropy coding. The method relates to performing coding block division on a point cloud by using a KD tree, numbering coding blocks in a breadth-first traversal order, pro- (Continued)

cessing the coding blocks one by one in the numbering order by using a point cloud intra-frame prediction scheme having four prediction modes, selecting an optical prediction mode by means of mode decision, and performing conversion, quantization, and entropy coding on a predicted residual, so as to achieve optimal performance of point cloud attribute compression.

6 Claims, 3 Drawing Sheets

(51) Int. Cl.
| | |
|---|---|
| H04N 19/156 | (2014.01) |
| H04N 19/159 | (2014.01) |
| H04N 19/176 | (2014.01) |
| H04N 19/186 | (2014.01) |
| H04N 19/61 | (2014.01) |
| H04N 19/625 | (2014.01) |
| H04N 19/91 | (2014.01) |
| H04N 19/96 | (2014.01) |

(52) U.S. Cl.
CPC ......... *H04N 19/159* (2014.11); *H04N 19/176* (2014.11); *H04N 19/186* (2014.11); *H04N 19/61* (2014.11); *H04N 19/625* (2014.11); *H04N 19/91* (2014.11); *H04N 19/96* (2014.11)

(58) Field of Classification Search
CPC .... H04N 19/186; H04N 19/61; H04N 19/625; H04N 19/91; H04N 19/96; H04N 19/129; H04N 19/103; H04N 19/184
See application file for complete search history.

(56) References Cited

U.S. PATENT DOCUMENTS

| | | | |
|---|---|---|---|
| 2016/0198156 A1* | 7/2016 | Jung | H04N 19/176 |
| | | | 375/240.03 |
| 2017/0347122 A1 | 11/2017 | Chou et al. | |
| 2019/0087978 A1* | 3/2019 | Tourapis | G06T 9/00 |
| 2019/0156518 A1* | 5/2019 | Mammou | G06T 7/0002 |
| 2020/0145651 A1* | 5/2020 | Abe | H04N 19/52 |
| 2020/0334866 A1* | 10/2020 | Lasserre | H04N 19/20 |

FOREIGN PATENT DOCUMENTS

| | | |
|---|---|---|
| CN | 107292935 | 10/2017 |
| CN | 107403456 | 11/2017 |

\* cited by examiner

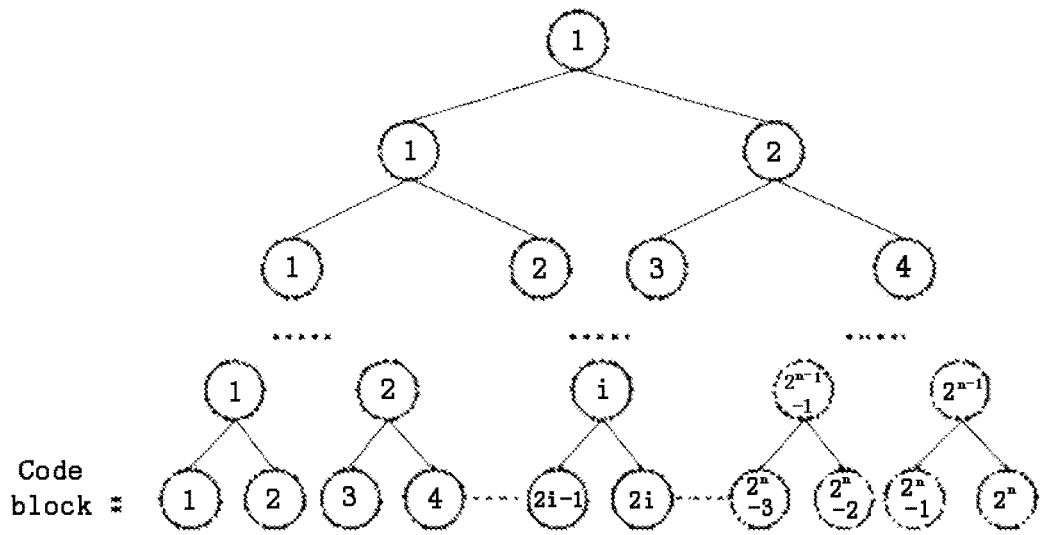
FIG. 2
| Header Information | Coding block 1 prediction mode | Coding block 1 residual code stream | Coding block 2 prediction mode | Coding block 2 residual code stream | ...... | Coding block i prediction mode | Coding block i residual code stream |
FIG. 3
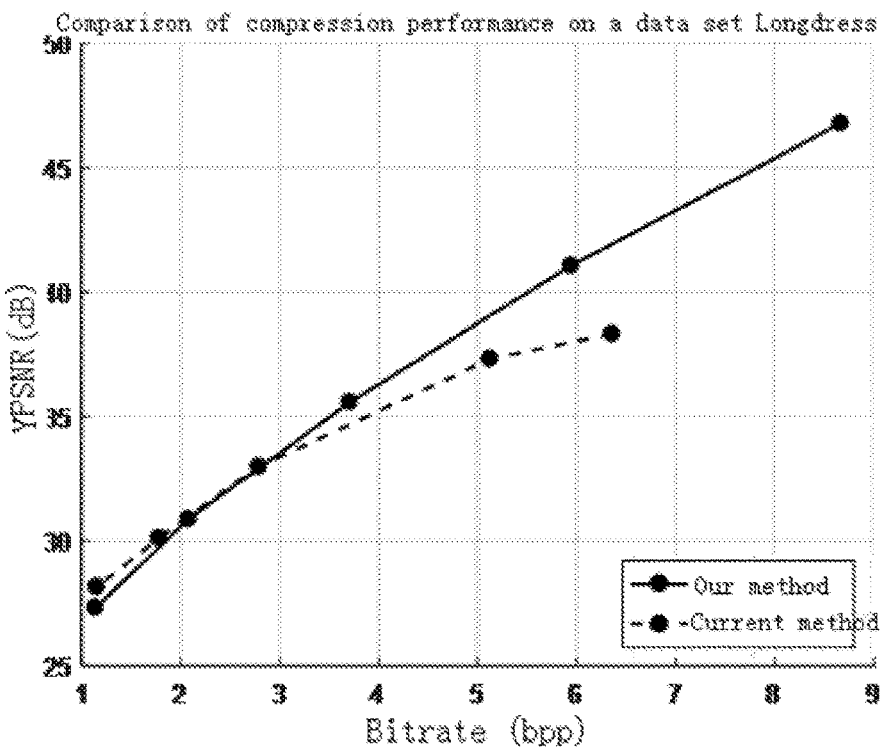
FIG. 4a

INTRA-FRAME PREDICTION-BASED POINT CLOUD ATTRIBUTE COMPRESSION METHOD

TECHNICAL FIELD

The invention belongs to the technical field of point cloud data processing, and relates to a point cloud data compression method, in particular to an intra-frame prediction-based point cloud attribute compression method.

BACKGROUND ART

Three-dimensional point cloud is an important digital representation form for digitalization of the real world. With the rapid development of three-dimensional scanning devices (laser, radar, etc.), the precision and resolution of point cloud are higher. High-precision point cloud is widely applied in urban digital map construction, and plays a technical support role in many hot researches such as intelligent cities, driverlessness, cultural relics protection and so on. The point cloud is obtained by sampling the surface of an object by a three-dimensional scanning device, the points of a frame of point cloud is generally in the level of millions, each point contains geometric information, color, texture and other attribute information, with a very large data volume. The huge data volume of three-dimensional point cloud brings great challenges to data storage and transmission, so that the point cloud compression is very necessary.

The point cloud compression is mainly divided into geometric compression and attribute compression, and the existing point cloud attribute compression framework mainly comprises the following methods.

1. A method based on octree decomposition and DCT includes the steps of: firstly, performing spatial decomposition on the point cloud by using the octree to obtain coding blocks, then performing depth-first traversal on the tree, writing color values of traversed nodes into a two-dimensional JPEG table according to a serpentine sequence, and then encoding the obtained point cloud color table by using an existing JPEG encoder, wherein DCT is used by the JPEG encoder. According to the method, an existing encoder is utilized, with low calculation complexity; however, the spatial correlation between points is not fully utilized, and the compression performance needs to be improved.

2. A method based on octree decomposition and graph transformation includes the steps of: firstly, performing spatial decomposition on the point cloud by using the octree, and dividing the point cloud into specific layers to obtain transformation blocks; forming a graph in each transformation block, connecting two points, with the distance not exceeding 1, along any coordinate axis by one edge, wherein the weight of the edge is inversely proportional to the Euclidean distance; and then performing graph transformation on the attribute information of the nodes in the graph. The compression performance of the method is good; however, the method has high operation complexity, can bring subgraph problems by its graph composition mode, and influences the efficiency of graph transformation; and it still has an improved space.

3. A method based on KD tree decomposition and graph transformation includes the steps of: firstly, performing spatial decomposition on point cloud by using the KD tree, and dividing the point cloud to a certain depth to obtain transformation blocks, wherein the number of points contained in each transformation block is approximately the same; in the transformation block, every two points are connected by one edge, the weight of the edge is related to the Euclidean distance, and a Euclidean distance threshold for the set edge determines the sparsity of the graph; and then performing graph transformation on the attribute information of the points in the graph. The method completely solves the subgraph problem; meanwhile, the compression performance is greatly improved compared with the former two methods, but the operation complexity is high, and the performance still needs to be improved.

SUMMARY OF THE INVENTION

In order to overcome the defects of the prior art and further improve the compression performance of the point cloud attribute under the condition of considering the computational complexity, the invention provides an intra-frame prediction-based point cloud attribute compression method, which provides four prediction modes by using a new block structure-based intra-frame prediction scheme to reduce information redundancy among different coding blocks of the point cloud as much as possible so as to improve point cloud attribute compression performance.

The technical scheme provided by the invention is as follows.

An intra-frame prediction-based point cloud attribute compression method is provided, comprising, for the point cloud data, performing coding block division on a point cloud by using a KD tree, numbering coding blocks in a breadth-first traversal order, processing the coding blocks one by one in the numbering order by using a point cloud intra-frame prediction scheme having four prediction modes, selecting an optical prediction mode by means of mode decision, and performing transformation, quantization, and entropy coding on a predicted residual, so as to achieve optimal performance of point cloud attribute compression; and the method comprises the following steps:

1) color space transformation of point cloud attributes: reading in point cloud attribute information to be processed, and transforming a point cloud color space from an RGB space to a YUV space according to the visual characteristics of human eyes and the difficulty degree of compression processing;

2) dividing the point cloud by using a KD tree to obtain coded blocks: performing KD tree division on the point cloud according to the geometric information, selecting a coordinate axis with a largest distribution variance in the position coordinate of the point cloud as a division axis each time, selecting a point with the coordinate being a median value as a division point, and performing iterative division until reaching a set KD tree depth; a block obtained from a last layer divided by the KD tree being a coded block of the point cloud, numbering the coded blocks according to a breadth traversal order;

the numbering sequence of the point cloud coding blocks is used as a prediction sequence of later-stage point cloud intra-frame prediction;

3) block structure-based intra-frame prediction: sequentially performing intra-frame prediction on the coding blocks according to the numbering sequence of the coding blocks, wherein the prediction modes comprises four prediction modes; when the intra-frame prediction is performed on a first coding block $b_1$, 128 is used as a reference value for Y-component prediction; when color components $Y_i$, $U_i$, and $V_i$ of other blocks $b_i$ ($i \neq 1$) are processed, 128 is used as a prediction reference value of $Y_i$ in a prediction mode I, and $U_i$ and $V_i$ are not predicted; a mean value $Y_{i-1}$ of Y-components of all points after reconstruction of a previous block $b_{i-1}$ is used for predicting $Y_i$ in the prediction mode II, and $U_i$ and $V_i$ are not predicted; mean values $U_{i-1}$ and $V_{i-1}$ of the U and V color components of all points after the reconstruction of the previous block are used for predicting $U_i$ and $V_i$ in the prediction mode III, and $Y_i$ is not predicted; $Y_{i-1}$, $U_{i-1}$, and $V_{i-1}$ are used as reference values of $Y_i$, $U_i$ and $V_i$ for predicting in the prediction mode IV; and the prediction modes comprises four prediction modes;

4) intra-frame prediction mode decision: four modes are used for predicting color components $Y_i$, $U_i$, and $V_i$ of the coding block $b_i$ ($i \neq 1$), an optimal prediction mode is required to be selected by mode decision which is not required for a first coding block; estimating a cost of a prediction mode using an SATD and an absolute value of a prediction residual transformation coefficient, wherein the prediction residual is transformed using a DCT; a smaller SATD value represents a lower cost of the prediction mode and better prediction performance, and the mode with the smallest SATD is selected as the prediction mode of the current block;

5) generation of a code stream with point cloud attribute compression: processing all the coding blocks according to the coding sequence, performing DCT transformation, uniform quantization and entropy coding on the predicted residual to obtain a final code stream with point cloud attribute compression;

the color space transformation in the step 1) comprises the following specific processes:

(1-1) a point $p_i$ in the point cloud has color values $r_i$, $g_i$, and $b_i$ in an RGB color space, the RGB is transformed into a YUV color space by a color space transformation matrix, and the color values thereof are $y_i$, $u_i$ and $v_i$;

(1-2) the mathematical expression for the color space transformation is $$[y_i, u_i, v_i] = [r_i, g_i, b_i] \times \begin{bmatrix} 0.2126 & 0.7152 & 0.0722 \\ -0.1146 & -0.3854 & 0.5 \\ 0.5 & -0.4542 & -0.0458 \end{bmatrix} \quad \text{(Formula 1)}$$

The specific process for dividing and numbering the coding blocks in the step 2) comprises the steps of: when the KD tree is divided, selecting a coordinate axis with the largest distribution variance of the points as a division axis, with a full consideration of the correlation of the points in the transformation block; meanwhile, selecting a point with the coordinate on the division axis being a median value as a division point, so that the number of points in the transformation block is basically the same. Let the point cloud to be processed have N points, and the division depth set by the KD tree be d, $2^d$ coding blocks are obtained after the point cloud is divided for d times; and all coding blocks are numbered with $b_1, b_2, \ldots, b_i, \ldots, b_{2^d}$ in the breadth traversal order.

According to the intra-frame prediction based on the coding block sequence in the step 3), the prediction reference value of the coding block is shown in table 1:

TABLE 1

Color component reference values for intra-frame prediction of coding blocks

| Coding block bi | Prediction mode | Yi reference value | Ui reference value | Vi reference value |
|---|---|---|---|---|
| i = 1 | 1 | 128 | 0 | 0 |
| i ≠ 1 | 1 | 128 | 0 | 0 |
|  | 2 | Yi − 1 | 0 | 0 |
|  | 3 | 0 | Ui − 1 | Vi − 1 |
|  | 4 | Yi − 1 | Ui − 1 | Vi − 1 |

The mode decision of the intra-frame prediction described in the step 4) above comprises the following specific processes: the prediction reference values of the color components $Y_i$, $U_i$, and $V_i$, of the coding block $b_i(i \neq 1)$ are $Y_{i\_ref}$, $U_{i\_ref}$ and $V_{i\_ref}$, respectively, the prediction residual $b_{i(res)}$ is calculated by a formula 2, the cost SATD of the prediction mode is calculated by a formula 3, and the mode with the smallest SATD is selected as an optimal prediction mode:

$$b_{i(res)} = (Y_i - Y_{i\_ref}) + (U_i - U_{i\_ref}) + (V_i - V_{i\_ref}) \quad \text{(Formula 2)}$$

$$\text{SATD} = \text{sum}(\text{abs}(\text{DCT}(b_{i(res)}))) \quad \text{(Formula 3)}$$

The specific process for the generation of a code stream with point cloud attribute compression in the step 5) comprises the steps of:

(5-1) performing the processes in the steps 1) to 4) to obtain numbered coding block prediction residuals and prediction mode information thereof; performing DCT transformation, uniform quantization and binarization on the prediction residuals to obtain a code stream with attribute information, combining the prediction mode information of the encoding block, and performing entropy encoding to obtain a final code stream with point cloud attribute compression;

(5-2) the performance of point cloud attribute compression is measured by a code rate and a Peak Signal to Noise Ratio (PSNR), wherein the ode rate can be obtained by dividing the total number of bits of a code word by the number of points of the point cloud, in units of bits per point (bpp), and PSNR is in decibel dB; the smaller the ode rate is, the larger the PSNR is, and the better the performance of point cloud attribute compression is.

According to the method, the intra-frame prediction is used for reducing information redundancy among coding blocks, four prediction modes are provided, the optimal mode is selected by the mode decision, and the traditional DCT transformation is used for compressing the point cloud attribute, with low calculation complexity, high attribute compression efficiency, and better point cloud compression performance.

Compared with the prior art, the invention has the beneficial effects. The invention provides an intra-frame prediction-based point cloud attribute compression method, which has the following technical advantages.

(1) A new intra-frame prediction scheme is proposed, which supports four prediction modes and effectively reduces the redundancy of attribute information between coding blocks.

(2) When different coding blocks are processed, the optimal prediction mode is selected by mode decision to realize the optimal compression performance for point cloud compression.

BRIEF DESCRIPTION OF THE DRAWINGS

FIG. 2 is an example diagram of KD tree division and encoding block numbering for a point cloud.

FIG. 3 is an example diagram of a code stream structure after point cloud attribute information compression.

FIGS. 4a, 4b and 4c are comparison diagrams comparing the compression performance of the method of the present invention with that of a conventional method.

Figure 4B:
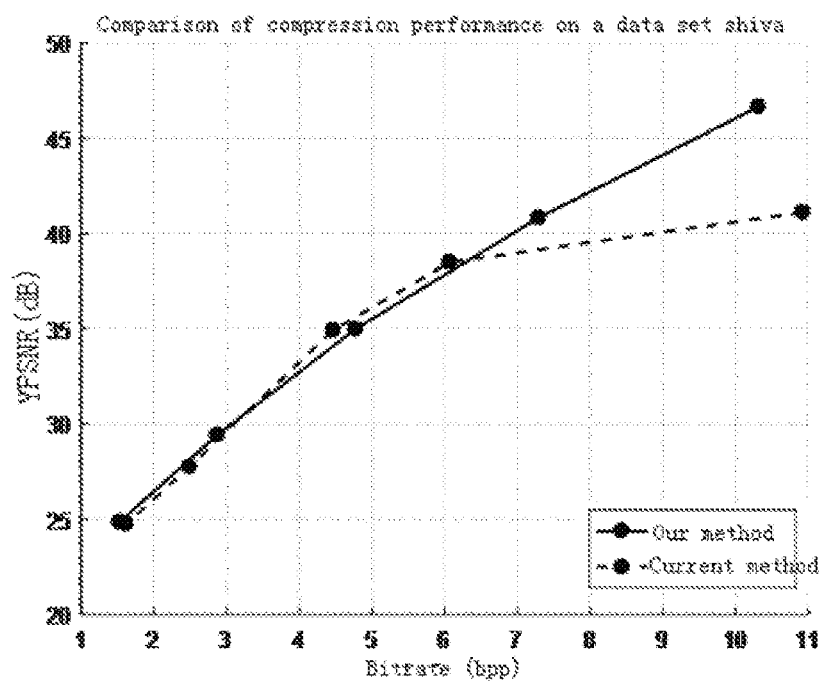
Figure 4C:
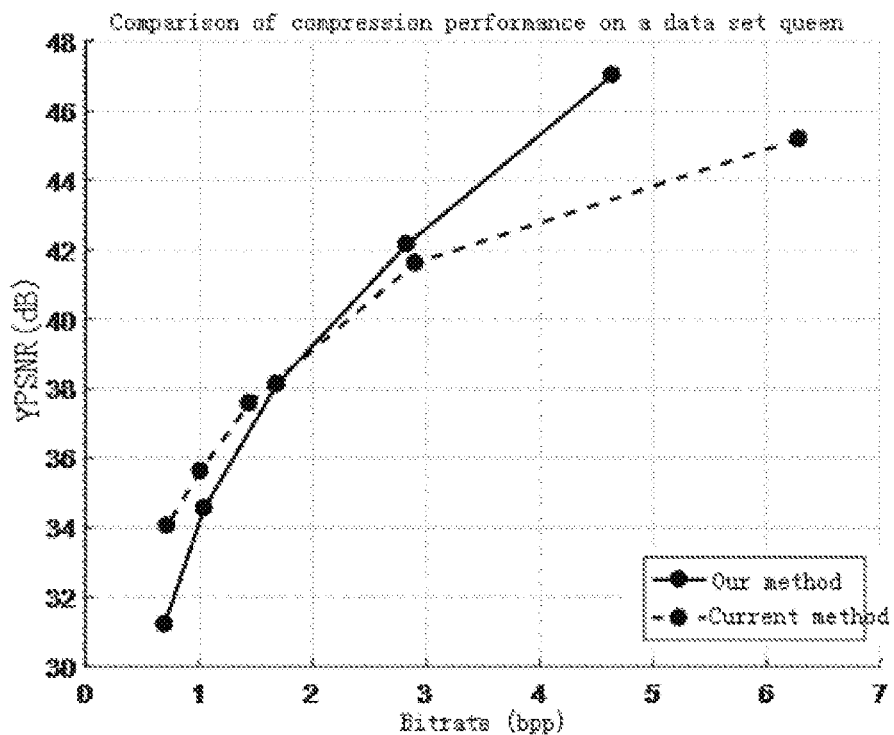

Wherein,

FIG. 4a is a comparison diagram for testing the compression performance of longdress_vox10_1300.ply;

FIG. 4b is a comparison diagram for testing the compression performance of Shiva35.ply;

FIG. 4c is a comparison diagram for testing the compression performance of Queen_frame_0200.ply.

DETAILED DESCRIPTION

The invention will now be further described, by way of example, with reference to the accompanying drawings, which do not limit the scope of the invention in any way.

The present invention provides an intra-frame prediction-based point cloud attribute compression method. A new block structure-based intra-frame prediction scheme is provided for point cloud attribute information, where four prediction modes are provided to reduce information redundancy among different coding blocks as much as possible to improve point cloud attribute compression performance; and FIG. 1 is a flow block diagram of the method of the present invention.

Figure 1:
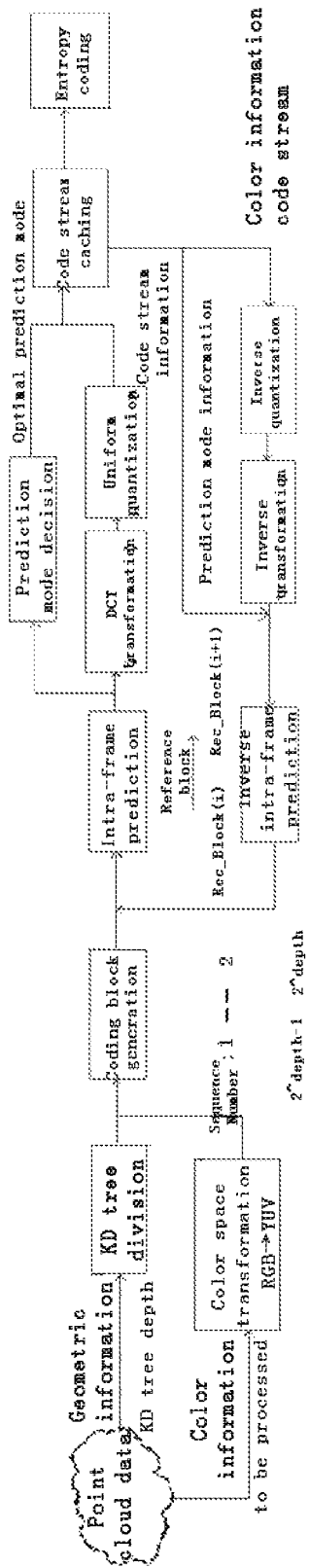
FIG. 1 is a flow block diagram of a method provided by the present invention.

For official point cloud data sets longdress_vox10_1300.ply, Shiva35.ply and Queen_frame_0200.ply in an MPEG point cloud compression working group, performing point cloud attribute compression by the method provided by the invention as shown in FIG. 1 includes the specific implementation steps as follows:

(1) Color space transformation of point cloud attributes: reading in cloud attribute information to-be-processed point, wherein a point $p_i$n) the point cloud has color values $g_i$, and $b_i$ in an RGB color space, the RGB is transformed into a YUV color space by a color space transformation matrix, and the color value thereof are $y_i$, $u_i$, and $v_i$, as shown in a formula 1:

$$[y_i, u_i, v_i] = [r_i, g_i, b_i] \times \begin{bmatrix} 0.2126 & 0.7152 & 0.0722 \\ -0.1146 & -0.3854 & 0.5 \\ 0.5 & -0.4542 & -0.0458 \end{bmatrix} \quad \text{(Formula 1)}$$

The RGB color values of the first point $p_1$ of the point cloud longdress_vox10_1300.ply are (102, 94, 87), and the YUV color values are (54.4128, −2.7926, 50.3798) obtained by the color transformation matrix processing.

The RGB color values of the first point $p_1$ of the point cloud Shiva35.ply are (125, 88, 54), and the YUV color values are (43.4902, 30.9580, 50.5518) obtained by the color transformation matrix processing.

The RGB color values of the first point $p_1$ of the point cloud Queen_frame_0200.ply are (102, 80, 71), and the YUV color values are (48.0172, 9.8702, 44.1126) obtained by the color transformation matrix processing.

(2) Dividing the point cloud by using a KD tree to obtain coded blocks: the KD tree is essentially a binary tree; when the point cloud is divided by the KD tree, selecting a coordinate axis with a largest distribution variance in the position coordinate of the point cloud as a division axis each time, selecting a point with the coordinate being a median value on the axis as a division point, and performing iterative division until reaching a set KD tree depth, the KD trees after division and coded blocks with numbers, as shown in FIG. 2.

The point cloud longdress_vox10_1300.ply has 857966 points, the KD tree division depth d is set to 13, and the number of points in the divided block is 104 or 105.

The point cloud Shiva35.ply has 1010591 points, the KD tree division depth d is set to 13, and the number of points in the divided block is 123 or 124.

The point cloud Queenframe_0200.ply has 1000993 points, the KD tree division depth d is set to 13, and the number of points in the divided block is 122 or 123.

(3) Block structure-based intra-frame prediction: (3) dividing all the points into a certain number of coding blocks according to the spatial position relation through the spatial division in the step (2), determining the sequence of the coding blocks by the breadth traversal sequence of tree division, and then performing intra-frame prediction on the coding blocks in sequence according to the number sequence. The point clouds longdress_vox10_1300.ply, Shiva35.ply, and Queen_frame_0200.ply all have 8192 encoding blocks, and all points within each block can be viewed as a class;

(3-1) when the intra-frame prediction is performed on the first coding block $b_1$, 128 is used as a prediction reference value of the Y component;

For example, the RGB color value of a first point of a first coding block for the longdress_vox10_1300.ply is (131, 96, 72), the color-transformed YUV color value is (52.85, 23.99, 54.16), and the color-predicted residual value is (−75.15, 23.99, 54.16).

(3-2) when color components $Y_i$, $U_i$ and $V_i$ of other blocks $b_i$ ($i \neq 1$) are processed, 128 is used as a prediction reference value of $Y_i$ in a prediction mode I; a mean value of $Y_{i-1}$ of Y color components of all points in a previous block $b_{i-1}$ is used for predicting $Y_i$ in a second prediction mode II; mean values $U_{i-1}$ and $V_{i-1}$ of U and V color components of all points in the previous block is used for predicting $U_i$ and $V_i$ respectively in a prediction mode III, and $Y_{i-1}$, $U_{i-1}$ and $V_{i-1}$ are used as reference values of $Y_i$, $U_i$ and $V_i$ for prediction in a prediction mode IV; and the prediction modes comprises four prediction modes;

For example, the point cloud longdress_vox10_1300.ply has a reconstructed color mean value of (105.25, −18.04, 20.79) for the first coding block $b_1$, which will serve as a prediction reference value for the second coding block $b_2$; and $b_2$ coding blocks can be performed with color prediction by using four prediction modes.

(4) Intra-frame prediction mode decision: four modes are used for predicting color components $Y_i$, $U_i$ and $V_i$ of the coding block $b_i$ ($i \neq 1$), and mode decision is performed by estimating the cost of each mode to select an optimal prediction mode; and the cost of the prediction mode is estimated by SATD, wherein the prediction residual is transformed by DCT, and the mode with the smallest SATD will be selected as the prediction mode of the current block;

For example, by prediction of the reconstructed color mean of the reference block of the second coding block in the point cloud longdress_vox10_10300.ply, the SATD values obtained by using the four modes are 2632.7588 (Mode I), 3457.2168 (Mode II), 2698.4360 (Mode III), and 2378.7190 (Mode IV); wherein, the mode IV has a smallest SATD value, and the mode IV is selected as a optimal prediction mode;

(5) Generation of a code stream with point cloud attribute compression: for 8192 coded blocks of the point cloud longdress_vox10_1300.ply, 8192 coded blocks of the Shiva35.ply and 8192 coded blocks of the Queen_frame_0200.ply, color information in the block is subjected to prediction, DCT transformation, quantization and entropy coding in sequence, combined with the code stream information in the prediction mode and transformation mode, and then written into a code stream file according to the sequence of the coded blocks, with the structure of the final code stream file as shown in FIG. 3. The performance of point cloud attribute compression is measured by the bitrate in units of bits per point (bpp) and Peak Signal to Noise Ratio (PSNR) in units of decibel dB.

In order to verify the effect of the intra-frame prediction-based point cloud attribute compression method of the present invention, experiments are carried out using the above three data sets longdress_vox10_1300.ply, Shiva35.ply, Queen_frame_0200.ply, and the compression performance of the present invention is compared with that of the existing method as shown in FIGS. 4a, 4b and 4c.

As can be seen from FIGS. 4a, 4b and 4c, the method of the present invention is significantly superior in performance of attribute compression with a high bitrate over the existing mainstream method in the three typical point cloud sequences tested (Octree and DCT based attribute compression, R. N. Mekuria, K. Blom, and P. Cesar, "Design, Implementation and Evaluation of a Point Cloud Codec for Tele-Immersive Video", IEEE Trans. CSVT, vol. PP, no. 99, pp. 1-1, 2016.). According to the method, a simple division mode KD tree is used, and an efficient redundancy elimination scheme of intra-frame prediction is combined, so that the advantages of compression performance are obvious and outstanding under the condition of point cloud compression with a high bitrate.

It should be noted that the examples are disclosed to aid in a further understanding of the present invention, but those skilled in the art will appreciate that various alternatives and modifications are possible without departing from the spirit and scope of the invention and the appended claims. Therefore, the invention should not be limited to the embodiments disclosed, but that the scope of the invention be defined by the claims.

INDUSTRIAL APPLICABILITY

According to the method of the present invention, the intra-frame prediction is used for reducing information redundancy among coding blocks, four prediction modes are provided, the optimal mode is selected by the mode decision, and the traditional DCT transformation is used for compressing the point cloud attribute, with low calculation complexity, high attribute compression efficiency, and better point cloud compression performance. It is an important expression form of real world digitization, and the method is widely applied in urban digital map construction, and plays a technical support role in many hot researches such as intelligent cities, driverlessness, cultural relics protection and so on. Therefore, the method is beneficial to promotion in the market.

The invention claimed is:
1. An intra-frame prediction-based point cloud attribute compression method, wherein a new block structure-based intra-frame prediction scheme is provided for point cloud attribute information, four prediction modes are provided to reduce information redundancy among different coding blocks as much as possible to improve point cloud attribute compression performance; the method comprises the steps of:
  1) color space transformation of point cloud attributes:
    reading in point cloud attribute information to be processed, and transforming a point cloud color space from an RGB space to a YUV space according to the visual characteristics of human eyes and the difficulty degree of compression processing;
  2) dividing the point cloud by using a KD tree to obtain coding blocks, and numbering the coding blocks according to a breadth traversal sequence
    reading in geometric information of the point cloud, performing KD tree division on the point cloud according to the geometric information, selecting a coordinate axis with a largest distribution variance in the position coordinate of the point cloud as a division axis each time, selecting a point with the coordinate being a median value as a division point, and performing iterative division until reaching a set KD tree depth; a block obtained by a last layer from the KD tree division being a coding block of the point cloud, numbering the coding blocks according to a breadth traversal order, and the number being used as a sequence for later processing of the coding blocks;
  3) performing intra-frame prediction on the attribute information of the point cloud coding block based on the numbering sequence, with four prediction modes:
    when the intra-frame prediction is performed on a first coding block $b_1$, 128 is used as a reference value for Y-component prediction; when color components $Y_i$, $U_i$, and $V_i$ of other blocks $b_i$ ($i \neq 1$) are processed, 128 is used as a prediction reference value of $Y_i$ in a prediction mode I, and $U_i$ and $V_i$ are not predicted; a mean value $Y_{i-1}$ of Y-components of all points after reconstruction of a previous block $b_{i-1}$ is used for predicting $Y_i$ in the prediction mode II, and $U_i$ and $V_i$ are not predicted; mean values $U_{i-1}$ and $V_{i-1}$ of the U and V color components of all points after the reconstruction of the previous block are used for predicting $U_i$ and $V_i$ in the prediction mode III, and $Y_i$ is not predicted; $Y_{i-1}$, $U_{i-1}$, and $V_{i-1}$ are used as reference values of $Y_i$, $U_i$ and $V_i$ for predicting in the prediction mode IV; and the prediction modes comprises four prediction modes;
  4) mode decision for intra-frame prediction:
    four modes are used for predicting color components $Y_i$, $U_i$, and $V_i$ of the coding block $b_i$ ($i \neq 1$), an optimal prediction mode is required to be selected by mode decision which is not required for a first coding block; estimating a cost of a prediction mode using a Sum of Absolute Transformed Differences (SATD) and an absolute value of a prediction residual transformation coefficient, wherein the prediction residual is transformed using a Discrete Cosine Transform (DCT); a smaller SATD value represents a lower cost of the prediction mode and better prediction performance, and the mode with the smallest SATD is selected as the prediction mode of the current block; and
  5) generation of a code stream with point cloud attribute compression: processing all the coding blocks according to the coding sequence, performing DCT transformation, uniform quantization and entropy coding on the predicted residual to obtain a final code stream with point cloud attribute compression.
2. The point cloud attribute compression method of claim 1, wherein the specific process of the color space transfor- mation in the step 1) is as follows: a point $p_i$ in the point cloud has color values $r_i$, $g_i$ and $b_i$ in an RGB color space; the RGB is transformed into a YUV color space by a formula 1, and the color values thereof are $y_i$, $u_i$ and $v_i$.

$$[y_i, u_i, v_i] = [r_i, g_i, b_i] \times \begin{bmatrix} 0.2126 & 0.7152 & 0.0722 \\ -0.1146 & -0.3854 & 0.5 \\ 0.5 & -0.4542 & -0.0458 \end{bmatrix}. \quad \text{(Formula 1)}$$

3. The point cloud attribute compression method of claim 1, wherein the KD tree division method in the step 2) is a binary division method; let the point cloud to be processed have N points, and the division depth set by the KD tree be d, $2^d$ coding blocks are obtained after the point cloud is divided for d times; and all coding blocks are numbered with $b_1, b_2, \ldots, b_i, \ldots, b_{2^d}$ in the breadth traversal order.

4. The point cloud attribute compression method of claim 1, wherein a reference value used for performing intra-frame prediction on the coding block in the step 3) is shown in the following table 1:

TABLE 1

Color component reference values for intra-frame prediction of coding blocks

| Coding block $b_i$ | Prediction mode | Yi reference value | Ui reference value | Vi reference value |
|---|---|---|---|---|
| i = 1 | 1 | 128 | 0 | 0 |
| i ≠ 1 | 1 | 128 | 0 | 0 |
|  | 2 | Yi − 1 | 0 | 0 |
|  | 3 | 0 | Ui − 1 | Vi − 1 |
|  | 4 | Yi − 1 | Ui − 1 | Vi − 1. |

5. The point cloud attribute compression method of claim 1, wherein the prediction reference values of the color components $Y_i$, $U_i$ and $V_i$ of the coding block $b_i$ (i≠1) in the step 4) are $Y_{i\_ref}$, $U_{i\_ref}$ and $V_{i\_ref}$ respectively, the prediction residual $b_{i(res)}$ is calculated by a formula 2, and the cost SATD of the prediction mode is calculated by a formula 3, with the specific process as follows:

$$b_{i(res)} = (Y_i - Y_{i\_ref}) + (U_i - U_{i\_ref}) + (V_i - V_{i\_ref}) \quad \text{(Formula 2);}$$

$$\text{SATD} = \text{sum}(\text{abs}(\text{DCT}(b_{i(res)}))) \quad \text{(Formula 3).}$$

6. The point cloud attribute compression method of claim 1, wherein the specific details in the step 5) comprise the steps of:

(6-1) performing the processes in the steps 1) to 4) to obtain numbered coding block prediction residuals and prediction mode information thereof; performing DCT transformation, uniform quantization and binarization on the prediction residuals to obtain a code stream with attribute information, combining the prediction mode information of the encoding block, and performing entropy encoding to obtain a final code stream with point cloud attribute compression;

(6-2) code stream of point cloud attribute information: the code stream of point cloud attribute information is mainly composed of compressed header information and coded block information; wherein the header information mainly comprises quantization step length and the like; the coded block information stream is arranged in the order of coded blocks in units of coded blocks, and each block mainly comprises prediction mode information and color residual information of the coding blocks; and (6-3) the performance of point cloud attribute compression is measured by a bitrate and a Peak Signal to Noise Ratio (PSNR), wherein the ode rate is in units of bits per point (bpp), and PSNR is in decibel dB; the smaller the ode rate is, the larger the PSNR is, and the better the performance of point cloud attribute compression is.

\* \* \* \* \*